United States Patent [19]
Gast et al.

[11] Patent Number: 5,499,095
[45] Date of Patent: Mar. 12, 1996

[54] FOURIER SPECTROMETER WITH EXCHANGEABLE ENTRANCE AND EXIT PORTS ALLOWING FOR BOTH INTERNAL AND EXTERNAL RADIATION SOURCES

[75] Inventors: Jürgen Gast, Rheinstetten; Arno Simon, Karlsruhe, both of Germany

[73] Assignee: Bruker Analytische MeBtechnik GmbH, Germany

[21] Appl. No.: 410,934

[22] Filed: Mar. 27, 1995

Related U.S. Application Data

[63] Continuation of Ser. No. 130,015, Sep. 30, 1993, abandoned.

[30] Foreign Application Priority Data

Oct. 2, 1992 [DE] Germany .................. 42 33 192.7

[51] Int. Cl.⁶ .......................... G01B 9/02; G01N 21/01
[52] U.S. Cl. .......................... 356/346; 356/244
[58] Field of Search .................. 356/346, 345, 356/244

[56] References Cited

U.S. PATENT DOCUMENTS

| | | | |
|---|---|---|---|
| 4,640,617 | 2/1987 | Hughes et al. | 356/244 |
| 4,657,390 | 4/1987 | Doyle | 356/346 |
| 4,784,488 | 11/1988 | Doyle et al. | 356/346 |
| 4,810,093 | 3/1989 | Doyle | 356/346 |
| 5,088,821 | 2/1992 | Milosevic | 356/346 |
| 5,153,675 | 10/1992 | Beauchaine | 356/346 |

OTHER PUBLICATIONS

Prospect IFS 66 (Jan. 1992) of Bruker Analytische Messtechnik GmbH, Rheinstetten "The Versatile FI-IR Spectrometer for Analytical and Research Applications".

*Primary Examiner*—Frank Gonzalez
*Assistant Examiner*—Jason D. Eisenberg
*Attorney, Agent, or Firm*—Walter A. Hackler

[57] ABSTRACT

The invention concerns an optical or infrared Fourier spectrometer with a plurality of entrances and exits for the coupling on of external sources or samples. The entrances can also be used as exits and vice versa.

17 Claims, 3 Drawing Sheets

1

FOURIER SPECTROMETER WITH EXCHANGEABLE ENTRANCE AND EXIT PORTS ALLOWING FOR BOTH INTERNAL AND EXTERNAL RADIATION SOURCES

This is a continuation of application Ser. No. 08/130,015, filed on Sep. 30, 1993, now abandoned.

BACKGROUND OF THE INVENTION

The invention concerns an optical Fourier transform (FT) spectrometer with optical means, installed inside the spectrometer housing, for guiding a beam of radiation from an internal radiation source, via a two-beam interferometer and a sample device, to an internal signal receiver with at least one entrance for the optional deflecting-in of a beam of radiation from an external radiation source into the spectrometer housing and internally movable optical means to guide this deflected-in beam of radiation to the interferometer and at least one exit for the optional deflecting of the beam of radiation coming out of the interferometer, via movable internal optical means, out of the spectrometer housing to an external sample device.

Such a Fourier spectrometer is, for example, known from the company publication "IFS 66" (Jan. 1992) of the company Bruker Analytische Mess technik GmbH.

Infrared (IR) spectroscopy fundamentally requires, in order to effect a usable result, the preparation of the measurement sample in a form or its location in a position, where it is accessible to a spectrometer measuring beam. In widespread laboratory analysis, the sample is usually embedded in either a solid or fluid matrix. A non-absorbing, pulverized salt is often utilized as a solid matrix with which the pulverized sample is pressed into a tablet, which is then introduced into the sample beam for a transmission measurement.

A suitable solvent is utilized as a fluid matrix which exhibits only a small self-absorption and in which the sample can be completely dissolved. The solution is introduced into an optical cell which is then subjected to the measuring beam for a transmission measurement.

For these types of standard measurements, the space which is available in the sample region of the spectrometer is completely sufficient. Likewise the accessories for somewhat more difficult measurement procedures, such as devices for granulates, fibers, and foils, usually have sufficient space in the sample region.

There are, however, a plurality of substances which cannot be prepared for a measurement with the assistance of these standard sample preparation measures. Included therein are gaseous samples, samples which must be cooled or heated, or samples whose dimensions are too large for the sample region. In order to spectroscopically measure samples of this kind it is necessary to utilize an appropriate accessory in or on which the sample can be arranged, and by means of which the measuring beam can be introduced onto the sample. Since, due to space limitations, such an accessory cannot be accommodated in the sample region of the spectrometer optics, it is necessary to position it outside of the spectrometer housing, whereby the measuring beam is guided out of the spectrometer optics.

Due to the large detection sensitivity offered by the FT-method, special measuring devices are utilized for a plurality of applications, the devices being preferentially arranged outside of the spectrometer optics. Included therewith are, for example, an IR measuring microscope, coupling between the spectrometer and a gas chromatograph (GC), or the connection to a measuring accessory for Raman measurements. Due to the enormous amount of collected information accessed by the FT-method, more and more extensive accessory units are being increasingly utilized which, due to their space requirements, are arranged outside the spectrometer housing.

Increasingly, the possibility of connection to not only a single, but rather to a plurality of external units is being required, among which the measurement beam, via switching mirrors, can be directed. For reasons of operational simplicity the switching is controlled by a computer via servo devices. An example for the connection of a plurality of units is a GC-IR-coupling, an IR-microscope, and a Raman accessory.

There is also an increasing demand for the capability of accepting measurement radiation from an external signal source such as, for example, a discharge lamp, a photoluminescense accessory or a distant radiation source. In these cases, it is necessary that an appropriate radiation entrance be available in the spectrometer optics.

Due to the plurality of needs in current analytic and research laboratories, a plurality of beam exit and entrances are desirable. Since for each such exit or entrance, a separate connection as well as an appropriate computer-controlled beam switching device must be available, an optical system with more than a total of approximately two external connection possibilities each, is very complicated. The current prior art is represented by the above mentioned spectrometer IFS 66.

This known Fourier spectrometer has up to three exits (external sample beams) and two entrances for external radiation sources. These entrances and exits can optionally be accessed through the displacement or tilting of mirrors in the spectrometer. Thereby it is possible to introduce into the spectrometer light from the external radiation sources which are to be examined, whereby in the experimental arrangement up to two radiation sources can be permanently provided for. By means of the up to three exits, it is possible to couple the spectrometer with other analytic methods, for example, GC, TGA (Thermal Gravimetric Analysis), TLC (Thin Layer Chromatography) and the like. However, for reasons of construction the entrances and exits per se are each fixed. This limits the flexibility of the operator. It is, for example, not possible for him to decouple a completed experiment from one exit and then couple-in, at this position, radiation from a newly assembled experiment, or, for example, to construct a configuration with (for example) five external radiation sources among which the spectrometer can be switched.

There is therefore a need for a more flexible Fourier spectrometer with which an increased possibility of combinations of external sources or detection means is given, access to which is facilitated by simple switching in the spectrometer.

It is the purpose of the invention to further improve a spectrometer of the above mentioned kind in such a fashion that the compact shape of the spectrometer is maintained and in that, by means of a simple switching in the spectrometer, at least one, and preferentially all entrances can also be utilized as exits and vice versa.

SUMMARY OF THE INVENTION

This purpose is achieved in that the internal optical means are so positioned and movable that an external radiation beam, which is deflected into the spectrometer housing through the at least one exit, can be so steered by means of these movable internal optical means that it travels through the interferometer reaching, finally, the internal detector and that a radiation beam emanating from the internal radiation source, which has travelled through the interferometer can, by means of these internal movable optical means, be steered in such a manner that it leaves the spectrometer housing through the at least one entrance.

In this manner the purpose of the invention is completely achieved.

In this fashion it is, namely, fundamentally possible to reverse the optical path of the deflected-in or deflected-out radiation beam while preserving the function of the interferometer.

Preferentially, the potential optical paths of the radiation beam deflected-out from the housing of the spectrometer and the radiation beam deflected-in have at least one mutual point of contact, in particular a crossing point at which a device for steering the deflected-in or deflected-out radiation beam is located.

In a preferred embodiment of the invention the paths of the deflected-in and deflected-out radiation beams cross each other a plurality of times and devices are arranged at these crossing points in order to steer the outwardly or inwardly deflected beam.

In a preferred embodiment of the invention the paths of the deflected-in and deflected-out radiation beams cross each other a plurality of times and devices are located at each crossing point in order to redirect the deflected-in and/or the deflected-out beam.

This has the advantage that, starting from these crossing points, further entrances and exits can be created.

It is preferred that the steering devices are computer-controlled.

This has the advantage that the switching can be carried out by the operator in a simple and user-friendly fashion and can be pre-programmed for an extended measurement program.

In an embodiment of the invention the outwardly deflected radiation beam, after passing through the externally located sample device, is deflected again into the spectrometer housing and is directed onto the radiation receiver inside the spectrometer optics.

This has the advantage that external samples can be measured without separate detectors.

In a preferred embodiment of the invention the means for steering the radiation beam include semi-permeable or half-silvered reflecting elements.

This has the advantage that standard beam splitters can be utilized and that the number of possible combinations of entrances and exits is increased. In addition, it is possible for the beam which is inwardly deflected from an external source as well as the beam which is outwardly deflected from the internal source to be simultaneously guided through the interferometer and directed to the internal or external signal receiver respectively. In this fashion it is possible to simultaneously obtain measurement data using a single interferometer, from two differing experiments (internal, external sample) without having their respective signals interfere with another. This embodiment approximately offers the capabilities of two independent spectrometers.

It is advantageous when the semi-permeable elements are mirrors which cover half the cross section of the beam.

In particular in combination with an interferometer which uses retro-reflectors as mirrors, it is possible to take advantage of the beam displacement on the retro-reflectors.

This is particularly advantageous when one is dealing with a "hot sample" whose emitted IR-light should not gain access to the interferometer. It is also possible to introduce light from two differing samples or sources into the spectrometer along differing paths.

Beam splitters are also particularly preferred which have reflectance and transmission characteristics which vary with the spectral region.

This has the advantage that, with a single spectrometer, it is possible to work simultaneously in differing spectral regions. Thereby it is, for example, possible to deflect the radiation from an external NIR-source into the spectrometer and to record with an internal NIR-detector while simultaneously transmitting radiation from an internal MIR-source to an externally arranged sample and to record with an external MIR-detector. It is, however, also possible to combine the radiation from two sources before the interferometer and to introduce it onto a sample or to divide the radiation between or among different detectors. The prerequisite for the operation in the wide wave-length region is the configuration of the interferometer with an appropriate wide-band beam splitter.

In an embodiment of the invention the means for deflecting the beam of radiation at least partially exhibit focusing characteristics.

This has the advantage that additional focusing means can be done away with.

In an embodiment of the invention the means for deflecting the beam of radiation exhibit, at least partially, polarizing characteristics.

This has the advantage that additional polarization means can be done away with.

In can be advantageous, in the event of a parallel beam of radiation between the last optical means within the spectrometer housing and an entrance or exit, to guide these beams through a, preferentially, internally mirrored pipe which can be optionally introduced into the spectrometer housing in such a manner that it surrounds the parallel beam.

In the following the invention is described in more detail with reference to the drawings.

Clearly the above mentioned features and those which are to be described in greater detail below can be used not only in the corresponding combination given but also in other combinations or individually without departing from the framework of the current invention.

DESCRIPTION OF THE PREFERRED EMBODIMENT

Figure 1:
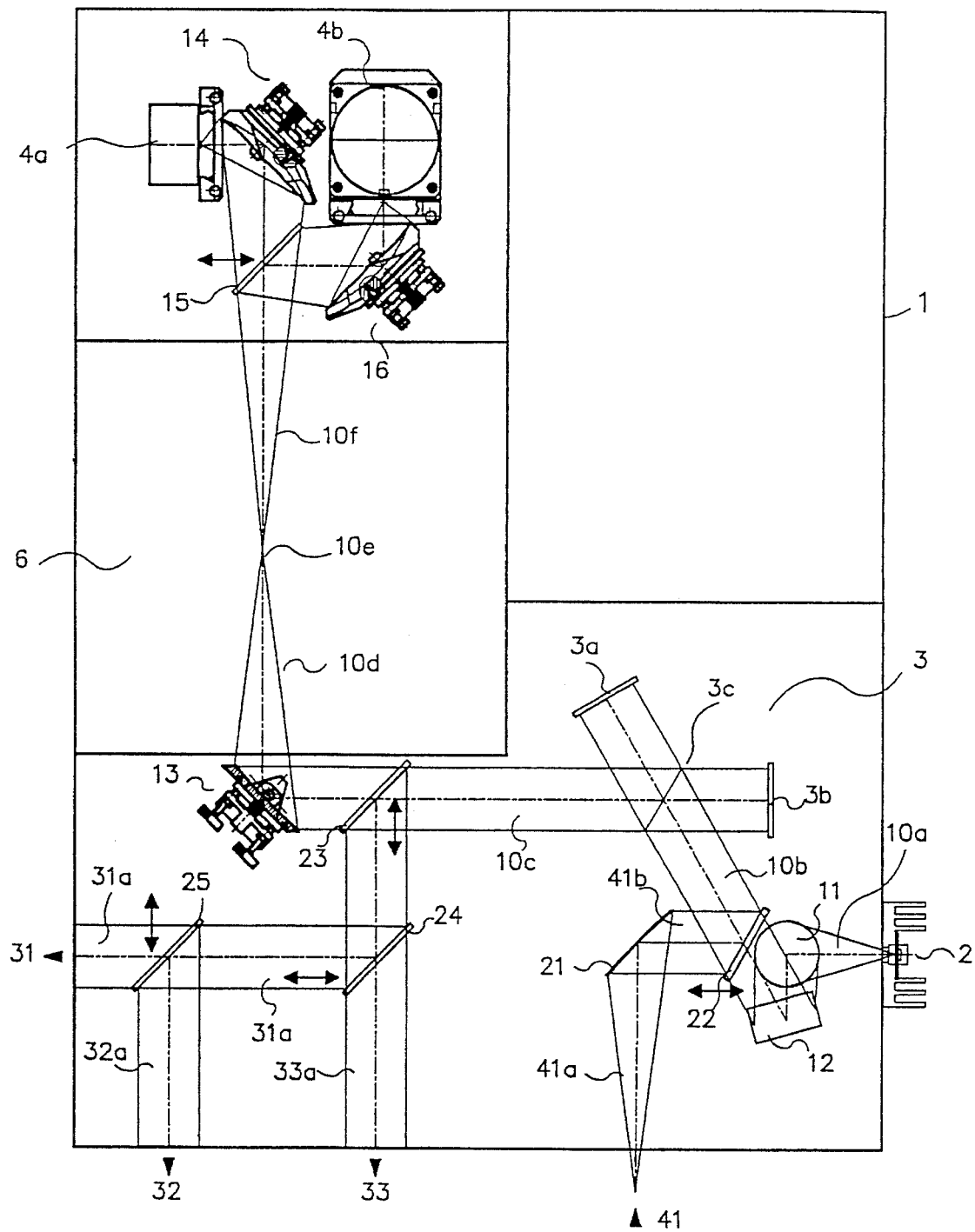
FIG. 1 shows the optics of a Fourier spectrometer according to prior art.

FIG. 1 shows schematically, in detail, a known Fourier spectrometer as is described in the company publication IFS 66. A radiation source 2, an interferometer 3 with movable mirrors 3a, 3b and a beam splitter 3c as well as two alternate detectors 4a, 4b are, integrated in or on a spectrometer housing 1. In internal operation the initially divergent beam of light 10a emanating from the source 2 impinges on a concave mirror 11, and travels as a parallel beam 10b via a planar mirror 12 into the interferometer 3. The parallel light beam 10c exiting the interferometer 3 travels into the sample space 6 via a focusing deflecting mirror 13 in the form of a converging beam of light 10d. A sample to be examined can be located at the focus 10e. After the focus, the divergent beam of light 10f exits the sample space 6 and impinges via a further focusing mirror 14 onto the detector 4a. Alternatively, through pivoting-in or insertion, in general, through introduction of the planar mirror 15, it is possible by means of the focusing mirror 16 to switch onto the detector 4b.

Additional movable mirrors 22–25 are located in the optical path by means of which it is possible to either couple-in or couple-out a beam of radiation. In this fashion with the assistance of the stationary mirror 21 and the movable mirror 22 it is possible, via entrance 41, to deflect a beam of radiation 41a,b from an external instead of the internal source into the spectrometer housing 1. The double arrowed symbol on the mirrors is intended to represent that these can be tilted, displaced or rotated to deflect the beam of radiation. This transpires, in general, under computer control. If, by way of example, the mirror 22 is removed from the beam of radiation 10b, it is possible for the light from the internal source 2 to reach into the interferometer 3. Should the mirror 22 be inserted, the light emanating from source 2 is blocked but light coming from an external source gains entrance into the interferometer 3 via entrance 41 and mirror 21. Altogether, in addition to entrance 41, three exits 31–33 are given in the example for the deflecting-out, by means of the mirrors 23, 24, or 25, of the radiation beam 10c, emanating from the interferometer 3 which subsequently becomes the exiting beam 31a, 32a, or 33a, for introduction onto an external sample.

The known spectrometer does not allow for the interchange of entrances and exits and thereby for the proper utilization of the internal components.

Figure 2:
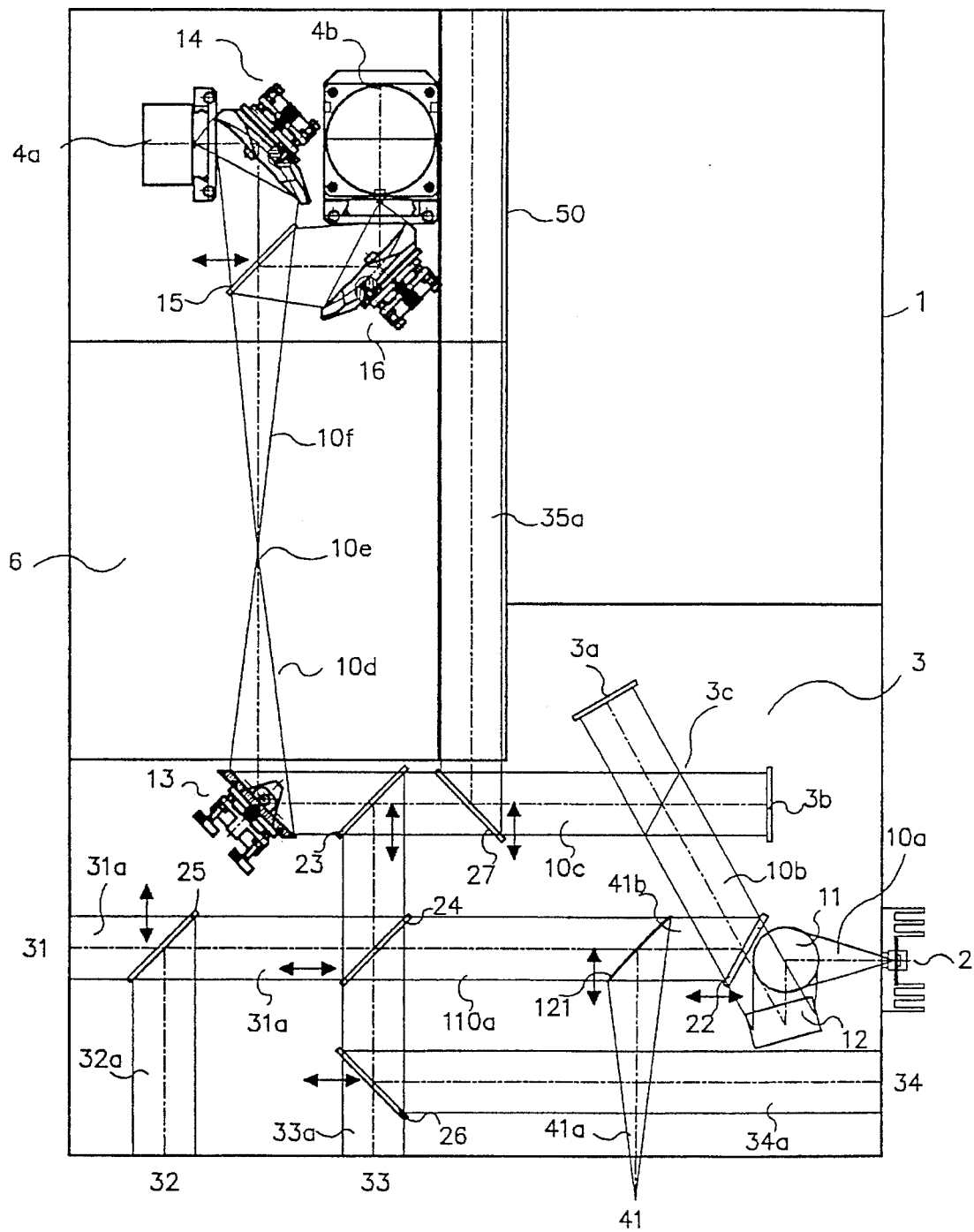
FIG. 2 shows an embodiment of the optics of a Fourier spectrometer in accordance with the invention.

In contrast thereto, FIG. 2 shows an embodiment of the spectrometer in accordance with the invention.

Analogous optical components are provided with the same reference symbols.

In order to prevent repetition the known functional features will not again be discussed in detail. The optical components are so arranged in spectrometer housing 1 that parallel beams of radiation 31a and 41b are coaxial. In this fashion a closed "ring" of possible radiation beams is formed in the spectrometer, beginning for example with mirror 22, to the interferometer 3, mirror 23 and mirror 24 back again to mirror 22. By pivoting-out, rotating, or displacing the movable mirror it is possible, as in the prior art according to FIG. 1, for the radiation beam coming from the internal source 2 and the entrance 41 to reach the interferometer 3, and, after passing through the interferometer 3, to be guided to an internal detector 4a, 4b or to each of the exits 31–33. In addition it is also possible for a beam of light which has been introduced via a previous exit 31–33 to be guided via the mirrors 25, 24, and 22 into the interferometer and from there via mirrors 13 and 14 to detector 4a or also via mirrors 23, 24, 25 again to one of the exits 31–33. Towards this end, it is possible for the mirrors to be, in part, semi-permeably reflecting. It is easy to see, with FIG. 2, that a beam of light coming from source 2 or from an arbitrary one of the now combined entrance exits 31–33, 41 to gain access to the interferometer 3 and after passing through it to either be guided to one of the internal detectors 4a,b or to an arbitrary one of the entrance exits 31–33, 41, in that the movable mirrors 15, 22, 121, 23, 24, and 25 are brought into the appropriate position. It is obvious to one of skill in the art that this can be achieved by means of displacement, tilting, rotation, or by a semi-permeable configuration of the mirrors.

Two additional entrance/exits 34, 35, with radiation beams 34a, 35a, are now provided for in FIG. 2 which can be switched in via the movable mirrors 26, 27. The remarks made above are also valid here. In particular with the long parallel path which is travelled by the beam 35a, it is possible that a parallel beam of radiation be surrounded by a preferentially internally mirrored pipe 50 which is introduceable into the spectrometer in order to, by means of reflection on the inner surfaces, guide the beam which, for all practical purposes, is always somewhat divergent.

In the following the function of the optical elements, in particular the moving ones, will be described in several examples. Obviously, this description, due to the plurality of combinatorial possibilities cannot be exhaustive in the limited embodiment of FIG. 2.

The focusing mirror 11 forms a parallel radiation beam out of the divergent radiation beam from the source 2. This is brought into the plane of the drawing by means of planar mirror 12 and gains access to the interferometer 3 via the beam splitter 3c, the interferometer only being shown in an exemplary fashion, and in particular the mirrors 3a, 3b can be configured as retro-reflectors. Optionally, the planar mirror 22 can be inserted into or pivoted into the parallel radiation path 10b so that instead of an internal radiation source 2, via entrance 41 and focusing mirror 121, an external source can be utilized. Up to this point there is no difference relative to the prior art according to FIG. 1. The focusing mirror 121 is now, however, in contrast to mirror 21 of prior art, movable and the parallel beam of radiation 41b emanating therefrom is coaxial to the beam of radiation 31a, which will be described further below. By removing the mirror 121 from the optical path and by introducing the mirror 22, one has the option of guiding the parallel beam 110a, which is likewise coaxial to the beams of radiation 41b and 31a, onto the beam splitter 3c of the interferometer 3. By rotation of the mirror 121 about an axis perpendicular to the plane of the drawing, it is further, by way of example, possible to guide radiation 10c from the interferometer 3 by means of planar mirror 23 and (rotated) planar mirror 24 via the beam of radiation 110a, with focusing, to the entrance 41 which now functions as an exit. By means of the planar mirror 27, which can be introduced or pivoted-in, it is optionally possible to guide the parallel beam 10c coming from the interferometer not onto the detectors 4a,b but rather via exit 35 out of the spectrometer housing 1 onto an external sample device. Clearly, the expression "external" always includes a module which is attached onto the housing. The exit 35 can also be utilized as an entrance. The light gains access (backwards), as radiation beam 35a, into the spectrometer via planar mirror 27, and from there via planar mirror 22 and mirror 121, for example, to exit 41 or, with mirror 121 removed, via the (rotated) mirror 24, and the (rotated) mirror 23 onto mirror 13 and from there, as previously, onto one of the internal detectors 4a,b.

At this point, the original exit 31 will, by way of example, now be described as an entrance. In a completely analogous fashion it possible for one to effect switched entrances in the other cases as well. Starting from entrance 31 the beam of radiation 31a gains access, with removed mirror 25, 24 and 121, to the interferometer 3 via the planar mirror 22 and from the spectrometer, as previously, to one of the internal detectors 4a,b or, by pivoting-in one or more the planar mirrors 27, 23, and 26, to one of the exits 35, 33, or 34. If the planar mirrors are semi-permeable it is possible for more combinations to be effected. It is also possible to go through the interferometer 3 in the backwards direction. Towards this end, the parallel beam 31a is introduced onto the mirror 23 through the pivoted-in mirror 24 and from there, with pivoted-out mirror 27, into the interferometer 3. From this point the light gains access to one of the exits 41, 33, or 34 via mirrors 22 and 121 or 24 and 26. Still more combinations are possible when using semi-permeable or half-silvered mirrors.

For this variability, it is important that the spectrometer optics be fashioned in such a manner that it is possible to bring, at a point (for example 24), the beam 10c emanating from the interferometer in contact with a beam which becomes the beam 10b impinging into the interferometer 3, i.e. the possible in- and outgoing beam paths form (among other things) a ring which, in this case, is formed through the elements 22, 3, 23, 24. This ring is not travelled by a continuous radiation beam but each partial section can be travelled through. This was not the case in prior art in the section between mirror 24 and 22 since the connection of the mirrors 25, 24, 21 and 22 was not coaxial, e.g. mirror 22 could not be reached from 24 for this reason alone and because, in addition, the stationary mirror 21 was in the way. Furthermore, the required motional freedom of the relevant mirrors was not provided for in prior art.

Figure 3:
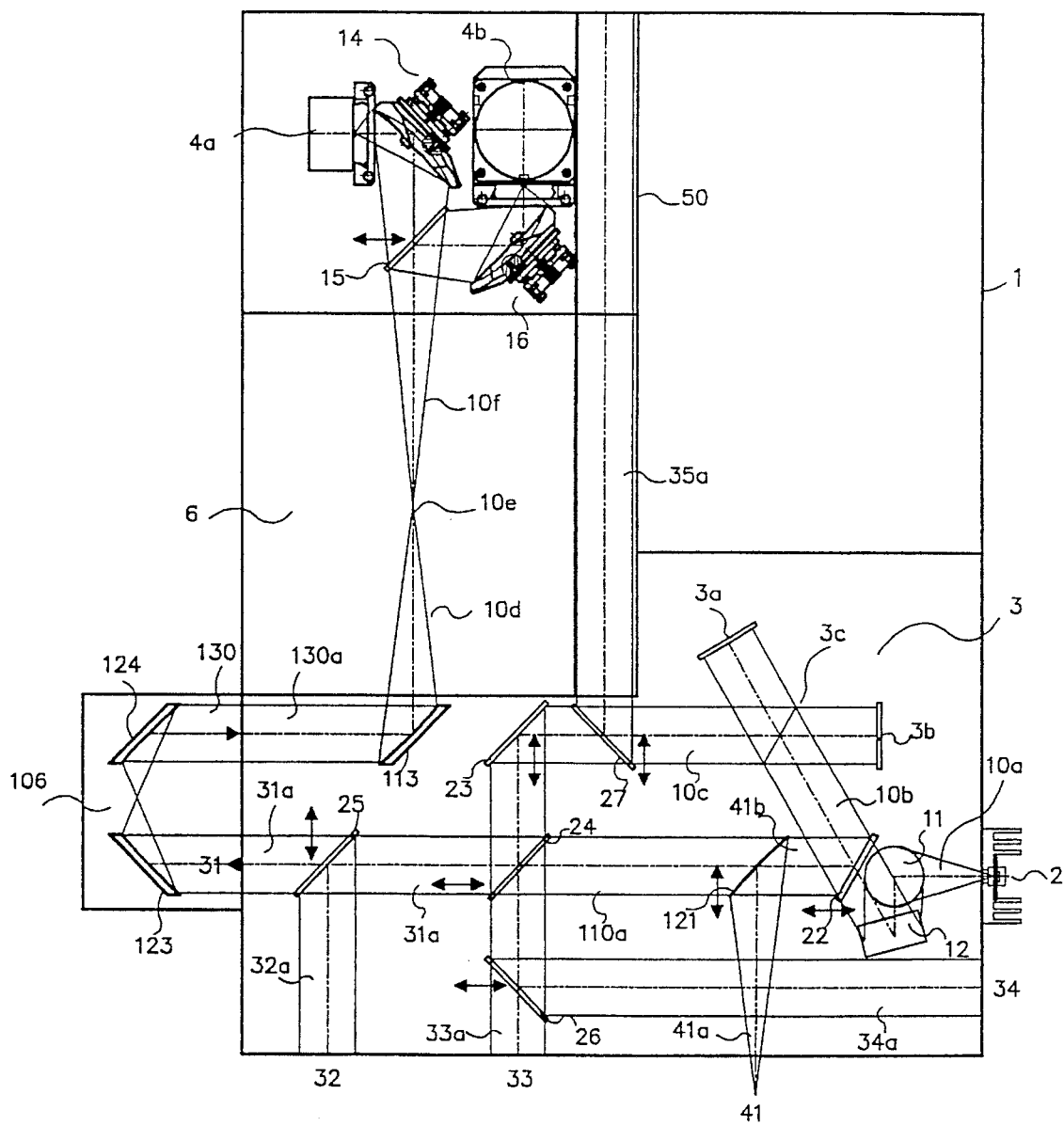
FIG. 3 shows a further embodiment of the optics of a Fourier spectrometer in accordance with the invention with an external sample and an internal detector.

The spectrometer of FIG. 2 is, in large part, shown in FIG. 3 but the focusing mirror 13 is now configured as mirror 113 which is movable and an additional entrance/exit 130 has been provided. This opens up the possibility, in an alternative operation mode, of operating the spectrometer with an external sample device 106 and an internal source 2 and detector 4a,b. In a possible embodiment of this operational mode, the light emanating from the source 2 exits, after passing through the interferometer 3, the spectrometer housing 1 via entrance/exit 31, impinges externally, via a focusing mirror 123, onto a sample 106, and after passing through the sample and an additional mirror 124 becomes parallel beam 130a, goes through entrance/exit 130 and returns again into the spectrometer housing 1 to finally reach, via the rotated mirror 1, as previously, the detector 4a or 4b.

We claim:

1. An optical Fourier transform spectrometer comprising:
    a spectrometer housing having an exit;
    an internal radiation source disposed within the housing and producing an internal radiation beam;
    an interferometer disposed within the housing;
    an external radiation source disposed outside of the housing and producing an external radiation beam;
    detector means disposed within the housing; and
    optical guiding means comprising stationary optical elements and movable optical elements, the movable optical elements having a first and a second position to effect an optical path reversal in the Fourier transform spectrometer, the movable optical elements, in the first position, guiding the internal radiation along a first optical path from the internal radiation source, through the interferometer, and through the exit out of the housing, the movable optical elements, in the second position, guiding the external radiation beam from the external radiation source through the exit into the housing, through the interferometer, and onto the detector means, wherein the first and second optical paths are reversed relative to each other along an optical path segment.

2. The spectrometer of claim 1, wherein there are a plurality of entrances and exits.

3. The spectrometer of claim 2, wherein each entrance can be utilized as an exit and each exit can be utilized as an entrance.

4. The spectrometer of claim 1, wherein the first and the second optical paths have a contact point, at which an optical element is located.

5. The spectrometer of claim 4, wherein there are a plurality of contact points.

6. The spectrometer of claim 1, wherein the optical guiding means are computer-controlled.

7. The spectrometer of claim 1, wherein the optical elements comprise semi-permeable reflecting elements.

8. The spectrometer of claim 7, wherein the semi-permeable reflecting elements comprise mirrors covering half the cross section of at least one of the internal and the external radiation beams.

9. The spectrometer of claim 7, wherein the semi-permeable reflecting elements comprise beam splitters having reflection and transmission characteristics that are different in different spectral regions.

10. The spectrometer of claim 1, wherein the optical elements comprise retro-reflectors as mirrors.

11. The spectrometer of claim 1, wherein the optical elements comprise focusing means.

12. The spectrometer of claim 1, wherein the optical elements comprise polarizing means.

13. The spectrometer of claim 1, wherein the optical elements comprise at least one internally mirrored pipe means for guiding a parallel radiation beam.

14. The spectrometer of claim 1 further comprising means for directing the internal radiation beam which has been deflected out of the spectrometer housing, after passing through an externally located sample device, back into the spectrometer housing for guiding onto the detector means.

15. An optical Fourier transform spectrometer comprising:
    a spectrometer housing having an exit;
    an internal radiation source disposed within the housing and producing an internal radiation beam;
    an interferometer disposed within the housing;
    an external radiation source disposed outside of the housing and producing an external radiation beam;
    detector means disposed within the housing; and
    optical guiding means comprising stationary optical element means and movable optical element means, the movable optical element means having a first and a second position to effect an optical path reversal in the Fourier transform spectrometer the movable optical element means, in the first position, guiding the internal radiation along a first optical path from the internal radiation source, through the interferometer, and through the exit out of the housing, the movable optical element means, in the second position, guiding the external radiation beam from the external radiation source through the exit into the housing, through the interferometer, and onto the detector means, wherein the first and second optical paths are reversed relative to another along a first and a second optical path segment, the first and the second optical path segments having a common contact point at which an optical element is located.

16. A method for operating a Fourier transform spectrometer, the spectrometer comprising a spectrometer housing having an exit, an internal radiation source disposed within the housing and producing an internal radiation beam, an interferometer disposed within the housing, an external radiation source disposed outside of the housing and producing an external radiation beam, detector means disposed within the housing, and optical guiding means comprising stationary optical element means and movable optical element means having a first and a second position, the method comprising the steps of:

a) setting the movable optical element means to the first position;

b) guiding, via the optical guiding means, the internal radiation along a first optical path from the internal radiation source, through the interferometer, and through the exit out of the housing;

c) setting the movable optical element means to the second position; and d) guiding, via the optical guiding means, the external radiation along a second optical path from the second radiation source through the exit into the housing, through the interferometer, and onto the detector means.

17. A method for operating a Fourier transform spectrometer, the spectrometer comprising a spectrometer housing having an exit, an internal radiation source disposed within the housing and producing an internal radiation beam, an interferometer disposed within the housing, an external radiation source disposed outside of the housing and producing an external radiation beam, detector means disposed within the housing, optical guiding means comprising stationary optical element means and movable optical element means having a first and a second position, the method comprising the steps of:

a) setting the movable Optical element means to the first position;

b) guiding, via the optical guiding means, the internal radiation along a first optical path from the internal radiation source, through the interferometer, and through the exit out of the housing;

c) setting the movable optical element means to the second position; and d) guiding, via the optical guiding means, the external radiation along a second optical path from the second radiation source through the exit into the housing, through the interferometer, and onto the defector means, the second optical path being reversed relative to the first optical path along first and second optical path segments having a common contact point at which an optical element is located.

* * * * *